(12) United States Patent
Schenk et al.

(10) Patent No.: US 9,602,204 B2
(45) Date of Patent: *Mar. 21, 2017

(54) LIGHT MODULE, ILLUMINATION SYSTEM AND METHOD INCORPORATING DATA IN LIGHT EMITTED

(71) Applicant: Koninklijke Philips N.V., Eindhoven (NL)

(72) Inventors: Tim Corneel Wilhelmus Schenk, Eindhoven (NL); Lorenzo Feri, Eindhoven (NL); Paulus Henricus Antonius Damink, Son en Breugel (NL); Martin Maurice Vernhout, Geldrop (NL); Dragan Sekulovski, Eindhoven (NL)

(73) Assignee: PHILIPS LIGHTING HOLDING B.V., Eindhoven (NL)

( * ) Notice: Subject to any disclaimer, the term of this patent is extended or adjusted under 35 U.S.C. 154(b) by 90 days.

This patent is subject to a terminal disclaimer.

(21) Appl. No.: 14/069,452

(22) Filed: Nov. 1, 2013

(65) Prior Publication Data

US 2014/0056588 A1 Feb. 27, 2014

Related U.S. Application Data

(63) Continuation of application No. 12/990,517, filed as application No. PCT/IB2009/051711 on Apr. 27, 2009, now Pat. No. 8,594,510.

(30) Foreign Application Priority Data

May 6, 2008 (EP) .................................. 08155713

(51) Int. Cl.
*H04B 10/00* (2013.01)
*H04B 10/116* (2013.01)
(Continued)

(52) U.S. Cl.
CPC ......... *H04B 10/116* (2013.01); *H04B 10/114* (2013.01); *H05B 37/02* (2013.01); *H05B 37/0272* (2013.01)

(58) Field of Classification Search
CPC . H04B 10/116; H04B 10/114; H04B 10/1149; H04B 10/502; H04B 10/112; H04B 10/1123; H04B 10/1141
(Continued)

(56) References Cited

U.S. PATENT DOCUMENTS 6,411,046 B1 * 6/2002 Muthu ........................ 315/309
6,552,495 B1 * 4/2003 Chang .................... F21V 23/04
315/158

(Continued)

FOREIGN PATENT DOCUMENTS

CN 1656690 A 8/2005
JP 60124398 A 7/1985
(Continued)

Primary Examiner — Hanh Phan
(74) Attorney, Agent, or Firm — Meenakshy Chakravorty

(57) ABSTRACT

Proposed is a light module (110) comprising at least two primary light sources (111,112,113) capable of emitting a primary color light. This allows the light module to emit light having intensity (Y) and color coordinates (x,y) through additive color mixing of the constituent primary colors. The light module further comprises an modulator (115) capable of modulating the primary light sources enabling embedment of data in the light emitted. The modulator (115) is arranged to modulate the color coordinates of the light emitted for embedding the data. This is especially advantageous as the sensitivity of the human eye to changes in color is lower than to changes in intensity. The invention thus advantageously allows embedding the data into the light emitted from the light modules (110) of an
(Continued)

illumination system (100) without reducing the performance of its primary function as an aid to human vision.

20 Claims, 2 Drawing Sheets

(51) Int. Cl.
*H04B 10/114* (2013.01)
*H05B 37/02* (2006.01)
(58) Field of Classification Search
USPC ....... 398/172, 118, 119, 128, 130, 183, 182,
398/192, 193, 194, 195, 196, 186, 197,
398/198, 202, 158, 159, 127, 135, 136,
398/137, 189, 187; 315/152, 297, 294,
315/291, 312, 151, 169.3, 158, 159, 293,
315/308, 153
See application file for complete search history.

(56) References Cited

U.S. PATENT DOCUMENTS 6,628,249 B1    9/2003  Kamikawa et al.
7,778,548 B2 *  8/2010  Yamamoto ................. 398/78
7,970,537 B2 *  6/2011  Ann ................... G01C 21/20
                                              398/172
8,594,510 B2 * 11/2013  Schenk et al. ............. 398/172
2002/0167701 A1 11/2002 Hirata
2006/0188254 A1  8/2006 Schorpp
2006/0237636 A1 10/2006 Lyons et al.
2007/0008258 A1  1/2007 Yamamoto
2008/0088244 A1  4/2008 Morishita
2008/0298811 A1* 12/2008 Son ................... H04B 10/116
                                              398/172

FOREIGN PATENT DOCUMENTS

| JP | 5021168 A     | 1/1993  |
| JP | 004320272 A   | 11/2004 |
| JP | 2007259111 A  | 10/2007 |
| JP | 2008252570 A  | 10/2008 |
| WO | 2006111930 A2 | 10/2006 |
| WO | 2008047996 A1 | 4/2008  |
| WO | 2008053422 A1 | 5/2008  |

* cited by examiner

LIGHT MODULE, ILLUMINATION SYSTEM AND METHOD INCORPORATING DATA IN LIGHT EMITTED

CROSS-REFERENCE TO PRIOR APPLICATIONS

This application is a Continuation of U.S. patent application Ser. No. 12/990,517, filed on Nov. 1, 2010, which is a U.S. National Phase application under 35 U.S.C. §371 of International Application No. PCT/IB2009/051711, filed on Apr. 27, 2009, which claims the benefit of European Patent Application No. 08155713.4, filed on May 6, 2008. These applications are hereby incorporated by reference herein.

FIELD OF THE INVENTION

The invention relates to a light module comprising at least two primary light sources capable of emitting a primary color light enabling the light module to emit light having intensity (Y) and color coordinates (x,y), the light module further comprising a modulator capable of modulating the primary light sources enabling embedment of data in the light emitted. Furthermore, the invention relates to an illumination system comprising such light modules. Moreover the invention relates to a method of embedding data in light emitted by the light modules. Such devices in particular are of interest in advanced control of illumination systems and free space transmission of data in confined spaces.

BACKGROUND OF THE INVENTION

An embodiment of an illumination system of the kind set forth is known from US2007/0008258. That document discloses an illumination based communication network making use of free space transmission of data incorporated in the light emitted by the light modules of the illumination system as intensity modulations. The lighting modules comprise a plurality of light emitting diodes (LEDs) each emitting light of different wavelengths (primary colors) and provide illumination usually requested from such systems for aiding visibility of objects to the human eye. Moreover, the network comprises a plurality of detectors each comprising multiple wavelength selective light-receiving elements (using band-pass filters) corresponding to the primary colors emitted by the LEDs.

The light modules transmit the data by (i) dividing a series of input signals into a plurality of signals corresponding to the different wavelengths of the LEDs, (ii) feeding each of the signals to the corresponding LED, (iii) performing code-division multiple access communication by modulating the emission intensities of the LEDs.

Receiving such modulated light allows a detector to (i) generate signals from each of the wavelength selective light receiving elements, (ii) correlate the signals with the spread code used tier data broadcasting by the light modules, (iii) descramble the signals and regenerate the data as an output on an output port of the detector.

A drawback of the solution described in US2007/0008258 is that the human eye is very sensitive for intensity variations, in particular in certain frequencies ranges. Thus, the secondary use of an illumination system as part of a communication network by implementing data in the light emitted as intensity variations may diminish the primary function of the system as an aid to human vision, especially when used in the high sensitivity frequency ranges of the human eye. Therefore, a clear need exists to provide an alternative modulation scheme allowing data to be transmitted without (or at least at a highly reduced rate of) decreasing the perceived performance of the primary function of an illumination system over wide modulation frequency ranges.

SUMMARY OF THE INVENTION

The invention has as an objective to provide an illumination system and modulation method that at least in part solves the need described above. The invention achieves this objective according to a first aspect by providing an illumination system comprising a plurality of light modules each comprising at least two primary light sources capable of emitting a primary color light enabling the light module to emit (combined) light having intensity and color coordinates, the light modules further comprising a modulator capable of modulating the primary light sources enabling embedment of data in the light emitted, characterized in that the modulator is arranged to modulate the color coordinates of the tight emitted.

Based on the insight that the sensitivity of the human eye to changes in color is lower than to changes in intensity, the invention advantageously allows embedding the data into the light emitted from the illumination system without diminishing the performance of its primary function as an aid to human vision.

In an embodiment of the invention the modulator is arranged to modulate the light according to a spread spectrum modulation scheme. In an embodiment, the data comprises a light module identification code. Advantageously, this allows the identification of individual light modules (and consequently their control) by a sensing device, even when it is illuminated by light originating from a multitude of light modules simultaneously.

In an embodiment, the light module further comprises a detector arranged to determine the color coordinates (x,y) of light emitted b the light module for calibrating the light emitted. Advantageously, this enables a feedback loop in order to control and stabilize the color point of the light emitted.

In an embodiment, the modulator is arranged to make use of a modulation alphabet, defining at least two chromaticity coordinates $(x_0,y_0)$ and $(x_1,y_1)$ representing at least a logical "0" and a logical "1", for modulation of the color coordinates. In an embodiment, at least two of the chromaticity coordinates $(x_0,y_0)$ and $(x_1,y_1)$, of the modulation alphabet are arranged to lie on a common axis with the target chromaticity coordinate $(x_T,y_T)$ of the light emitted. In yet another embodiment, the common axis forms the elongated axis of the MacAdam ellipse around a target chromaticity coordinate $(x_T,y_T)$ of the light emitted. Advantageously, this arrangement minimizes the visibility of the color coordinate modulation for an observer, while simultaneously it maximizes the detectability for a sensing device.

In an embodiment, the least two chromaticity coordinates $(x_0,y_0)$ and $(x_1,y_1)$ represent a predetermined color shift $\Delta xy_0$ and $\Delta xy_1$, respectively. This embodiment has considerable advantage when embedding data using a modulation in a more homogeneous non-distorted reference color space, such as the CIE L*a*b* and CIE Luv spaces.

According to a second aspect the invention provides an illumination system comprising a plurality of light modules according to the invention. In an embodiment, the illumination system further comprises a remote sensing device arranged to determine the color coordinates (x,y) of light emitted by the light modules for detecting the data embedded in the light emitted.

According to a third aspect the invention provides a method of embedding data into the light emitted by a light module of an illumination system, comprising the steps (i) arranging the light module to comprise at least two primary light sources capable of emitting a primary color light enabling the light module to emit light having an intensity and color coordinates, (ii) modulating the primary light sources using a modulator, (iii) arranging the modulator to modulate the color coordinates of the light emitted.

These and other aspects of the invention will be apparent from and elucidated with reference to the embodiments described hereinafter.

BRIEF DESCRIPTION OF THE DRAWINGS

Further details, features and advantages of the invention are disclosed in the following description of exemplary and preferred embodiments in connection with the drawings.

DETAILED DESCRIPTION OF THE EMBODIMENTS

Figure 1:
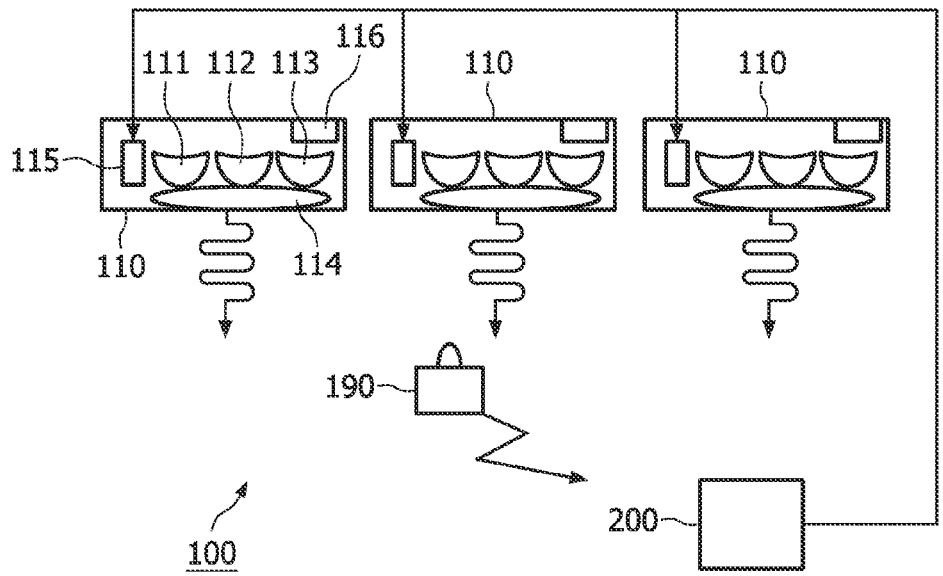
FIG. 1 shows an embodiment of an illumination system according to the invention

FIG. 1 shows an illumination system 100 according to the invention. The system comprises a plurality of tight modules 110. Each module comprises at least two primary light sources 111,112,113 capable of emitting a primary color light enabling the light module to emit combined light having intensity (Y) and color coordinates (xy) through mixing the primary color light emitted by the light sources using appropriate mixing optics 114. The light sources can in principle be of any type, such as gas discharge bulbs, inorganic light emitting diodes (LEDs), organic LEDs, and laser diodes. Thus, as an example a light module 110 may comprise three primary color light sources 111,112,113 emitting red, green, and blue light, respectively. Alternatively, the light modules might comprise more than three light sources, such as a fourth amber LED. Alternatively yet, the light modules 110 may even comprise a (fifth) phosphor-coated LED emitting a broadband predefined spectrum such as white light. The light modules 110 further comprise a modulator 115 capable of modulating the primary light sources enabling embedment of data in the light emitted. In an embodiment, the light module 110 further comprising a detector 116 arranged to determine the color coordinates (xy) of light emitted by the light might module for calibrating the light emitted.

In an embodiment the data (comprising f.i. a light module identification code, data relating to the constituent primary color light sources 111,112,113, lighting characteristics of the light emitted, or non-lighting related data such as music or information about an object, a picture, or statue positioned near the light module 110) is implemented using a spread spectrum technique. Such a technique is known as "code-division multiplexing/multiple access" (CDM or CDMA). To each lighting module 110 a unique ID code is allocated. The ID codes must be orthogonal, that is, a value of an autocorrelation of a code must be significant higher than a value of a cross-correlation of two different codes. A sensing device 190, for instance comprising a photo-sensor, is then able to discriminate between simultaneous transmissions of modulated light by different light modules 110, so that the sensing device can identify each of them. Furthermore, the sensing device 190 can measure a lighting property (intensity, color point, etc) of the modulated light received from the identified light module 110. For each sensed emission of modulated light the sensing device 190 transfers data preferably wireless using f.i. ZigBee protocol) containing an identification of the emitting light module 110 and a value of the measured lighting property to the master controller 200. Acquiring such data allows the master controller to control light modules 110, changing the intensity or color point of the light emitted to meet the desired light effects in an area around the sensing device 190. The light effect forms the primary function of the illumination system 100, while embedding and transmission of the data forms the secondary function.

The (combined) light effect, assuming it to have tristimulus values XYZ, can be characterized in the CIE xyY color space using the well known relations:

$$x=X/(X+Y+Z) \text{ or } X=(Y/y)\cdot x$$

$$y=Y/(X+Y+Z)$$

$$z=Z/(X+Y+Z) \text{ or } Z=(Y/y)\cdot z=(Y/y)\cdot(1-x-y) \quad \text{Eq. 1}$$

Figure 2:
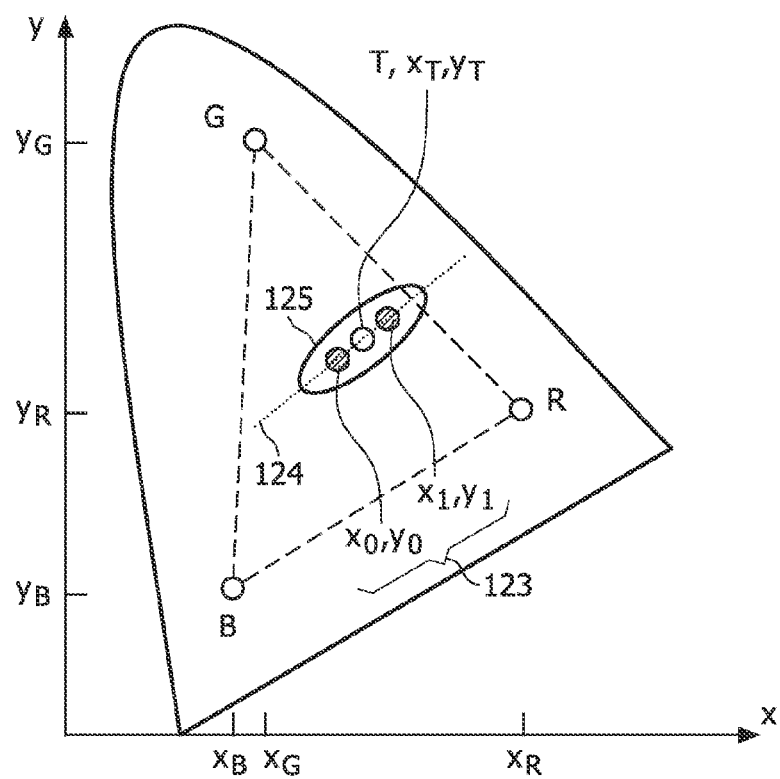
FIG. 2 shows the CIE xy chromaticity diagram

FIG. 2 schematically shows the xy plane of this color space, known as the chromaticity diagram. Assume for the following explanation that the light modules 110 comprise three LEDs emitting in the red, green, and blue part of the visible spectrum with intensities $Y_R$, $Y_G$, and $Y_B$, respectively, and having chromaticity coordinates $(x_R,y_R)$, $(x_G,y_G)$, and $(x_B,y_B)$, respectively. The light effect, created by additive color mixing of these primary light sources, can than be characterized in terms of the constituent components as:

$$\begin{pmatrix} X \\ Y \\ Z \end{pmatrix} = \begin{pmatrix} X_R & X_G & X_B \\ Y_R & Y_G & Y_B \\ Z_R & Z_G & Z_B \end{pmatrix} \cdot \begin{pmatrix} 1 \\ 1 \\ 1 \end{pmatrix} \quad \text{Eq. 2}$$

The xyY coordinates of the (combined) light effect can then be found using Eq. 1.

The prior art modulation scheme implements the data as orthogonal codes using a spread spectrum technique by modulating the optical power output of each of the primary light sources 111,112,113. With each primary light source corresponding essentially to a different wavelength (or channel), each channel has specific data attributed to it. Thus the R channel specific data corresponds to modulations in $X_R,Y_R,Z_R$, and similarly to modulations in $X_G,Y_G,Z_G$ and $X_B,Y_B,Z_B$ for the G & B channel specific data, respectively. Eq. 2 then shows that intensity $Y=Y_R+Y_G+Y_B$ does not stay constant but exhibits modulations itself, which depending on the frequencies used can severely diminish the primary function of the illumination system 100. The inventive concept, in contrast, is based on the insight that the data can be implemented alternatively by modulation of the chromaticity coordinates (x,y) of the light effect while keeping its intensity Y constant. Advantageously, as the human eye shows a lower sensitivity to modulations in the chromaticity coordinates of a light effect than to modulations in its intensity, the invention provides a data transmission concept for use in an illumination system without diminishing the perceived performance of the primary function of the illumination system over wide modulation frequency ranges.

Figure 3:
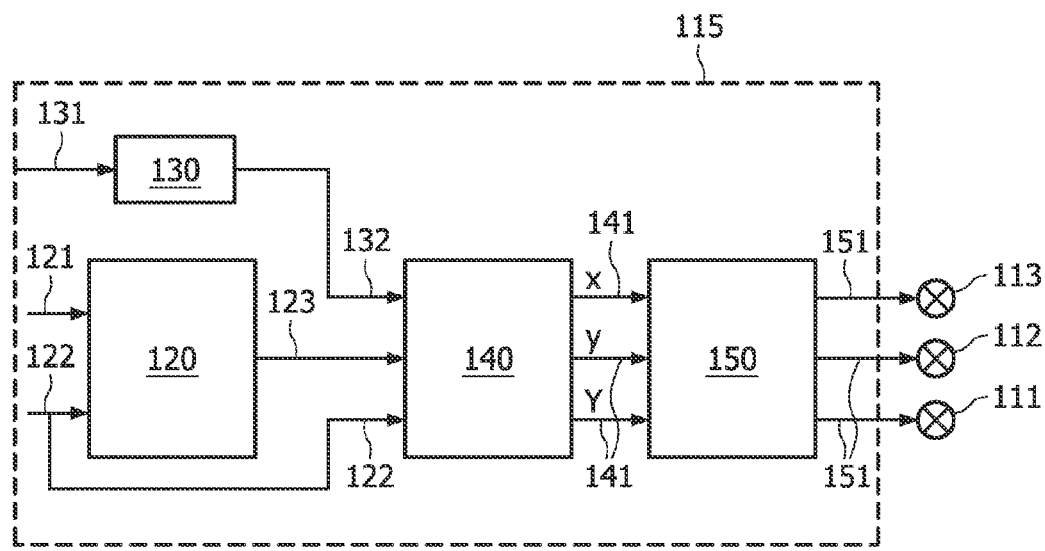
FIG. 3 shows an embodiment of the modulator in a light module according to the invention

FIG. 3 shows an embodiment of the modulator 115 comprised in a light module 110 according to the invention. In this example the light module comprises three primary light sources 111, 112, 113. Again, however, the data embedding concept of the invention functions for any light module having at least two primary light sources. Mixing the light emitted from the primary light sources 111, 112, 113 creates a light effect. The target light effect 122, supplied by the master controller 200 (see FIG. 1), is given by the chromaticity coordinates $(x_T, y_T)$ (see point T in FIG. 2) and intensity Y. The modulator 115 comprises a modulation alphabet generator 120, a (optional) encoder 130, a mapper 140 and a (optional) transformer 150.

Modulation alphabet generator 120 generates modulation alphabet 123 based on an alphabet size 121 input indicator. For instance if the alphabet size equals 2, a logical "0" and a logical "1" may correspond to a modulation alphabet 123 having chromaticity coordinates $(x_0, y_0)$ and $(x_1, y_1)$, respectively. Alternatively, an alphabet size equalling 4 enables creating 2 bit pairs having logical values "00", "01" "10", and "11" and corresponding to the chromaticity coordinates $(x_0, y_0)$, $(x_1, y_1)$, $(x_2, y_2)$, and $(x_3, y_3)$, respectively. Similar mappings can be created for alphabet sizes 121 equalling 8, 16, etc. Thus, advantageously, a larger alphabet size 121 enables enhancing the modulation alphabet 123 allowing essentially fir an increased data broadcasting bandwidth. Preferably the alphabet chromaticity coordinates $(x_0, y_0)$, $(x_1, y_1)$, etc, are created such that their average corresponds to the target chromaticity coordinate $(x_T, y_T)$. Advantageously, this minimises the visibility of the color coordinate modulation to the human eye.

The data signal 131 to be embedded in the (combined) light emitted may be fed to an optional encoder 130 to create encoded data 132. The encoder 130 may add f.i. redundant bits for error-correcting. Advantageously, this makes the data transmission and reception more resistant to errors caused by f.i. noise. Examples of such redundant bits could be codes using checksum, parity bits, or a cyclic redundancy check.

Subsequently feeding the target light effect 122, the modulation alphabet 123, and the encoded data 132 to the mapper 140 allows to map the data to the chromaticity coordinates around the target $(x_T, y_T)$. This results in a symbol stream 141 defining the light effect (x,y,Y) to be created by the light module 110 and comprising the embedded data to be transmitted under the condition that Y remains constant (i.e. equal to $Y_T$). Transformer 150 transforms the symbol stream 141 to the LED drive signals 151 for the individual primary light sources 111, 112, 113. This transformation operation depends on the chromaticity coordinates $(x_R, y_R)$, $(x_G, y_G)$, and $(x_B, y_B)$ of the actual primary light sources present in the light module 110. In other words, transformer 150 correlates the CIE xyY space to "RGB" color space attainable by the primary light sources in this embodiment. Alternatively, the modulation alphabet generator 120 may be configured to already include the knowledge on the primary light source chromaticity coordinates. Such a configuration reduces the transformation operation of the transformer 150 to the identity operation.

Figure 4:
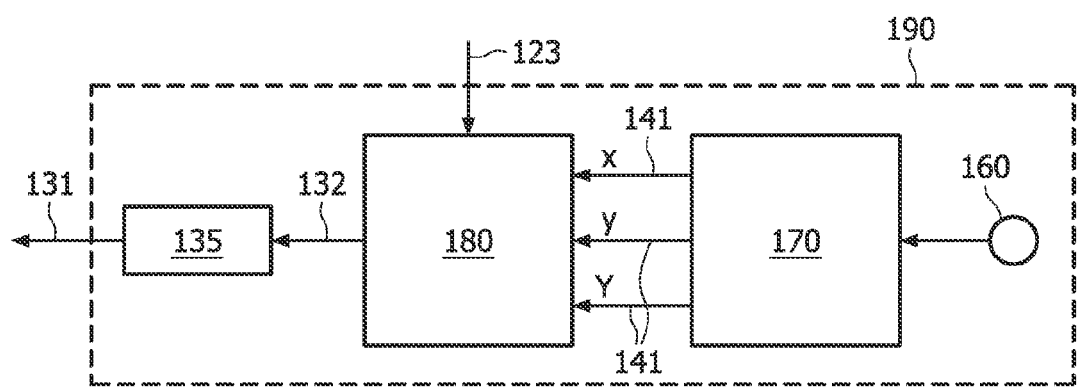
FIG. 4 shows an embodiment of the sensing device comprised in an illumination system according to the invention

FIG. 4 shows an embodiment of the sensing device 190 comprised in an illumination system 100 according to the invention. It comprises a color sensor 160, a (optional) color transformer 170, a symbol detector 180, and a (optional) decoder 135. Furthermore, the sensing device may comprise an appropriate transceiver unit and a user interface (both not shown) allowing it to communicate with the master controller 200 and an operator, respectively.

Similar to the transformer 150, color transformer 170 correlates the color space of the color sensor 160 to the CIE xyY color space. This correlation equals the identity transformation in case the spectral sensitivity of the color sensor equals the CIE color matching functions. Thus the color transformer 170 allows to reconstruct the symbol stream 141 defining the (combined) light effect (x,y,Y) to be created by the light module 110 and comprising the embedded data to be transmitted under the condition that Y remains constant (i.e. equal to $Y_T$).

Subsequently, the symbol detector 180 reconstructs the (encoded) data from the symbol stream 141. Availability of the modulation alphabet 123 forms a prerequisite to this reconstruction. In an embodiment the modulation alphabet 123 is predetermined and available in a look-up table on a memory medium comprised in the sensing device 190. The look-up table comprises a listing of the target chromaticity coordinates $(x_T, y_T)$ and the corresponding chromaticity coordinates $(x_0, y_0)$, $(x_1, y_1)$, etc of the modulation alphabet 123. Alternatively, information on the modulation alphabet 123 may be comprised in the light transmitted by the light modules 110 as a preamble to the actual data. This allows the symbol detector 180 to learn interpret the symbol stream 141. In this embodiment, a preamble should be transmitted every time the target chromaticity coordinates $(x_T, y_T)$ of the light effect created by the illumination system 100 changes. In yet another embodiment, the modulation alphabet 123 can be generated through implementing a fixed color shift, irrespective of the target color point $(x_T, y_T)$. Thus, in this embodiment a logical "0" corresponds to a color shift $\Delta xy_0$ and a logical "1" corresponds to a color shift $\Delta xy_1$. This embodiment has considerable advantage when embedding data using a modulation in a. more homogeneous non-distorted 110 reference color space, such as the CIE L*a*b* and CIE Luv spaces (see below).

Similar to the optional encoder 130 in the modulator 115, the decoder 135 in the sensing device 190 is optional and allows reconstructing the data from the output 132 of the symbol detector 180.

The above describes the color coordinates in terms of the CIE 1931 xyY color 115 space. Many other color spaces exist, such as f.i. the CIE 1960 Luv, the CIE 1964 U*V*W*, the CIE 1976 L*a*b*, and the HSL color spaces. All these spaces may be transformed into one another using well known transformation relations. Describing the invention as modulating/demodulating the color coordinates of the light emitted does not limit the scope to the XYZ or xyY space. The scope extends to any color space.

In an embodiment of the chromaticity coordinates $(x_0, y_0)$, $(x_1, y_1)$, etc of the modulation alphabet 123 are arranged to lie on a common axis 124 with the target chromaticity coordinate $(x_T, y_T)$ of the light emitted (see FIG. 2). In an embodiment, the common axis 124 forms the elongated axis of the MacAdam ellipse 125 around a target chromaticity coordinate $(x_T, y_T)$ of the light emitted. Advantageously, this arrangement minimizes the visibility of the color coordinate modulation for an observer, while it maximizes the detectability for a sensing device. While the CIE xyY color space displays a significant distortion of recognisable color differences (i.e. the size and orientation of the MacAdam ellipses 125 vary widely depending on the test color: large for greenish colors, small for bluish colors and intermediate for reddish colors), other color spaces—such as the CIE L*a*b* and CIE Luv—were designed to display a considerable smaller distortion. The corresponding ellipses in these spaces therefore become considerably more circular, but remain to have an elongated axis.

Although the invention has been elucidated with reference to the embodiments described above, it will be evident that alternative embodiments may be used to achieve the same objective. The scope of the invention is therefore not limited to the embodiments described above. Accordingly, the spirit and scope of the invention is to be limited only by the claims and their equivalents.

The invention claimed is:

1. A light module comprising:
   at least two primary light sources capable of emitting a primary color light enabling the light module to emit light having intensity (Y) and color coordinates (x,y); and
   a modulator for modulating the primary light sources enabling embedding of data in the light emitted, wherein the modulator is configured to modulate the color coordinates of the light emitted for embedding the data.

2. The light module according to claim 1, wherein the data comprises a light module identification code.

3. The light module according to claim 1, wherein the modulator is arranged to modulate the light according to a spread spectrum modulation scheme.

4. The light module according to claim 1, further comprising a detector arranged to determine the color coordinates (x,y) of light emitted by the light module for calibrating the light emitted.

5. The light module according to claim 1, wherein the modulator is arranged to make use of a modulation alphabet, defining at least two chromaticity coordinates and representing at least a logical "0" and a logical "1", for modulation of the color coordinates.

6. The light module according to claim 5, wherein the at least two of the chromaticity coordinates of the modulation alphabet are arranged on a common axis with a target chromaticity coordinate of the light emitted.

7. The light module according to claim 6, wherein the common axis forms the elongated axis of the MacAdam ellipse around the target chromaticity coordinate (xT,yT) of the light emitted.

8. The light module according to claim 5, wherein the least two chromaticity coordinates (x0,y0) and (x1,y1) represent a predetermined color shift Δxy0 and Δxy1, respectively.

9. An illumination system comprising a plurality of light modules according to claim 1.

10. The illumination system according to claim 9, further comprising a remote sensing device arranged to determine the color coordinates (x,y) of light emitted by the light modules for detecting the data embedded in the light emitted.

11. The illumination system according to claim 10, wherein the remote sensing device is further arranged to identify at least one light module of the plurality of light modules based on the data embedded in the light, and wherein the remote sensing device is further arranged to measure a light property of the at least one light module.

12. The light module according to claim 1, wherein the modulator is further configured to modulate the color coordinated of the light emitted for embedding the data while keeping the intensity (Y) constant.

13. A method of embedding data into the light emitted by a light module of an illumination system, comprising the steps:
   arranging the light module to comprise at least two primary light sources capable of emitting a primary color light enabling the light module to emit light having an intensity (Y) and color coordinates (x,y),
   modulating the primary light sources enabling embedding of data in the light emitted using a modulator, and
   configuring the modulator to modulate the color coordinates (x,y) of the light emitted while keeping the intensity (Y) constant.

14. The method according to claim 13, wherein the data comprises a light module identification code.

15. The method according to claim 13, further comprising configuring the modulator to modulate the light according to a spread spectrum modulation scheme.

16. The method according to claim 13, further comprising configuring a detector to determine the color coordinates (x,y) of light emitted by the light module for calibrating the light emitted.

17. The method according to claim 13, wherein the at least two of the chromaticity coordinates and, of the modulation alphabet are arranged on a common axis with a target chromaticity coordinate of the light emitted.

18. The method according to claim 17, wherein the common axis forms the elongated axis of the MacAdam ellipse around the target chromaticity coordinate of the light emitted.

19. The method according to claim 18, wherein the least two chromaticity coordinates and represent a predetermined color shift Δxy0 and Δxy1, respectively.

20. The method according to claim 13, further comprising configuring a remote sensing device to determine the color coordinates (x,y) of light emitted by the plurality of light modules for detecting the data embedded in the light emitted.

* * * * *